July 14, 1925.  
D. G. LILLEY  
WAVE MOTOR  
Filed Aug. 20, 1923  
1,545,504
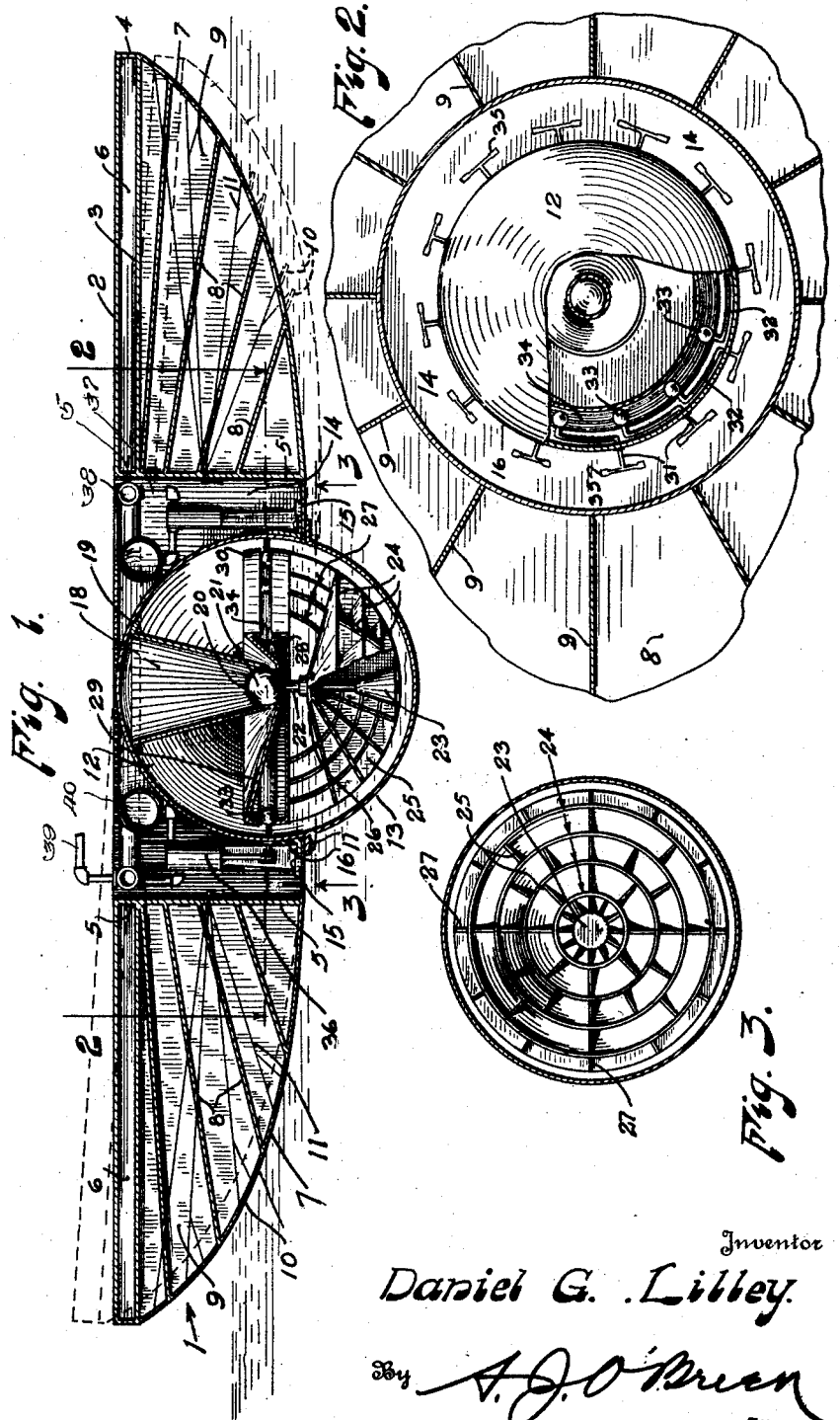
Inventor  
Daniel G. Lilley,  
By A. J. O'Brien  
Attorney Patented July 14, 1925.

1,545,504

UNITED STATES PATENT OFFICE.

DANIEL G. LILLEY, OF DENVER, COLORADO.

WAVE MOTOR.

Application filed August 20, 1923. Serial No. 658,344.

*To all whom it may concern:*

Be it known that I, DANIEL GRAY LILLEY, citizen of the United States, residing at Denver, in the city and county of Denver and State of Colorado, have invented certain new and useful Improvements in Wave Motors; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in mechanisms of the type employed in transforming the energy of the ocean waves into useful work, and which are popularly known as "wave motors".

In our complex civilization, power plays a part of ever-increasing importance. At present, thanks to our extensive fuel supply, we obtain the greatest percentage of our power from steam and internal combustion engines with an increasing percentage from water power. It has, however, been recognized for years that the ocean waves and the tides have an unlimited amount of potential energy and if this energy could be converted into power, enough of it would be available to supply the world with heat, light and power for all times to come.

Many different types of mechanisms have been designed for transforming the energy of the ocean waves into such a form that it could be employed for the production of heat and power, but, as far as I am aware, none of them have gone into extensive use.

It is the object of this invention to produce a wave motor which will be entirely protected from the action of the elements, which is adapted to be built in any size necessary to produce the required amount of power and shall be of simple and substantial construction. It shall have a minimum of parts and require the minimum amount of repairs and attention.

The above and other objects, which will appear as the description proceeds, are attained by means of a structure which I will now describe in detail, reference for this purpose being had to the accompanying drawing in which the preferred form thereof is shown, and in which:

Fig. 1 is a diametrical vertical section of my motor.

Fig. 2 is a section taken on line 2—2, Fig. 1; and

Fig. 3 is a section taken on line 3—3, Fig. 1.

Numeral 1 represents, as a whole, the float portion of my motor which is preferably circular in plan and has an upper annular or ringlike deck 2. Directly below this and spaced therefrom is a second deck 3. The inner and outer edges of decks 2 and 3 are connected by circular members 4 and 5 which serve to form a water-tight annular compartment 6. The bottom 7 of the float is dished and has its outer edge connected to member 4, and is also connected to the lower edge of the central wall 5. A plurality of annular inclined decks 8 extend from the central wall 5 to the inside of the bottom 7, forming cone-shaped compartments. Vertical cone-shaped walls 9 divide the radial compartment into a plurality of smaller compartments or rooms. The bottom 7 is provided at every room with a plurality of valves 10 which are normally closed and which have a check-valve action whereby the water is prevented from entering the rooms and water within the rooms is permitted to leave. This provides what may be termed, "a self-bailing arrangement" which assures that the rooms or compartments will always be free from water, except when it is desired to flood them with water, as may sometimes be necessary during severe storms. I have provided means, indicated diagrammatically by the lines 11 for maintaining the valves 10 open whenever the compartments are to be flooded. When there is a heavy sea or severe storm, one or more of the many compartments may be flooded so as to permit the motor to become partially submerged and thus relieve it from excessive strains due to the roughness of the sea. The reason this mechanism is not shown in detail, is that the specific construction is immaterial, as the valves may be opened and closed by a variety of specifically different means.

It is evident that the annular float 1 which I have just described will float on the water and will rock as the waves pass the same. I will now describe the mechanism or means by which the rocking of the float can be converted into power in a practicable form.

Within the central opening formed by wall 5, I secure a spherical casing formed preferably of an upper spherical portion 12 and a lower complemental portion 13. The diameter of the spherical casing is less than the diameter of the central compartment and it is secured centrally of the compartment so as to leave an annular work space 14 between the inside of wall 5 and the outside of the casing. A floor 15 forms the bottom of the work space. A curved angle 16 has one flange secured to the floor and to the other flange the spherical portion 12 is secured. The complemental spherical portion 13 is provided with an outwardly projecting flange 17, by means of which it can be held in place so as to form a spherical chamber. The portion 12 may also be provided with openings, manholes or doors which have not been shown, but by means of which a man may enter the chamber whenever such a course is found to be necessary. Secured to the inner surface of the upper portion 12 is a bracket 18 which has been shown as a hollow cone, having its base provided with a flange 19 by means of which it is secured to part 12. The lower end of the bracket terminates in a spherical socket 20 which forms a bearing for the ball 21. The parts are so proportioned that the center of the socket 20 coincides as nearly as possible with the center of buoyancy of the float so that as the latter rocks on the water surface, it will rock about the center of the socket. Secured to the ball 21 is a heavy bar or pendulum 22 which is provided at its lower end with a weight 23. It is apparent that the pendulum will always remain in a vertical position, regardless of the position of the float, the universal ball and socket joint permitting the float to rock in any direction without affecting the position of the pendulum. As it is my intention to employ the relative motion between the pendulum and the float for the production of power, it is necessary to provide means for increasing the inertia of the pendulum to a maximum, or perhaps, more precisely speaking, to increase its resistance to sudden movement to as great an extent as possible. For this purpose I have secured to the pendulum a plurality of conical shaped rings 24, the spaces between which are divided into compartments by means of radial plates 25. Near the tops of each ring are holes 26 which permit the air to flow out so that the compartments will become full of water. Rods 27 serve as braces and connect the conical rings to the bottom 28 of an air-tight compartment which is secured to the upper end of the pendulum. This compartment has a conical top member 29 which is joined to the bottom by means of an annular member 30. The compartment just described serves as a float and supports the weight of the pendulum. It will be pointed out here that the spherical casing is partly filled with a heavy liquid such as water, oil or mercury. The level of this liquid extends to such a height that the buoyancy of the compartment substantially equals the weight of the pendulum so that very little, if any, weight is borne by the ball and socket joint; in fact, the pressure is preferably in an upward direction. At this point let us stop and consider the operation of the apparatus as far as it has been described.

If we imagine that the float is being tilted into the dotted line position (Fig. 1), the pendulum being immersed in a liquid whose surface will remain level, regardless of the extent to which the float is tilted, will remain in a vertical position and may be considered as being as absolutely stationary as if it were anchored to the ground. This is, of course, not literally true, as there are various forces at work that will cause the pendulum to swing slightly, but for all practical purposes, it is stationary. It is evident that in order to cause the pendulum to swing about its center, the entire mass of the pendulum and the liquid in which it is immersed must be moved. The liquid within the compartments between the walls 24 becomes in effect a part of the mass of the pendulum and therefore its inertia becomes comparatively large.

It is now necessary to provide mechanism by means of which the relative movement of the pendulum and the spherical casing and float may be transformed into a moving force that can be used to operate pumps for compressing air or pumping water, or any other power transmitting mechanism.

In Fig. 2 I have shown a plurality of shafts 31 that are journaled in suitable bearings in the spherical portion 12. I want to call particular attention at this place to the fact that the axes of these shafts, when projected, all pass through the center of ball 21 which is the center of oscillation of the pendulum and its compartment. On the inside of the spherical casing the shafts are bent so as to form curved crank arms 32. Each arm is curved on the arc of a circle whose center is the center of the ball 21. The ends of arms 32 are bent into inwardly directed crank pins 33 whose axes also pass through the center of the ball 21. The crank pins terminate in spherical portions which engage an annular groove 34 in the side 30. To the outside of the shafts 31 I have secured crank disks 35, gear wheels, pulleys or any other means of transmitting motion and power. When the float rocks there is relative movement between the pendulum and the spherical casing and this movement will rotate the shafts 31 first in one direction and then in the other. The arms 32 must be of such length that they will not reach a dead center position with the maximum relative movement of the casing and the pendulum. I want to call attention at this point to the importance of having the shafts 31 mounted in such a manner that their axes pass through the center of oscillation of the pendulum; that the arms 32 are curved about the center of oscillation; and that the cranks 33 are so bent that their axes pass through the center of oscillation. If any of these conditions are wanting, there is liable to be a binding action, but with all of these conditions present the pendulum may swing freely relative to the casing and in swinging it will oscillate to varying degrees the crank disks 35.

It is now necessary to convert the power which oscillates the crank disks 35 into such energy that it can be usefully employed. This can be accomplished in many different ways, but as an example of one way in which this can be done, I have shown (Fig. 1) a number of reciprocating pumps 36 that have their delivery ports connected by means of pipes 37 with a reservoir 38, which may have trapped air therein that may be put under pressure or which has attached thereto at intervals air chambers such as are ordinarily employed in connection with high pressure pumps for the purpose of compensating for the pulsating discharge from the pumps. The liquid such as oil from the reservoir 38 is passed through pipe 39 to a Pelton wheel (not shown) or some other form of liquid engine which in turn may be made to rotate a dynamo by means of which electrical energy is generated. The electricity is then transmitted by cables to suitable storage plants from which it is distributed. The pumps shown are merely meant to be illustrative, as different types of pumps may be used. From the Pelton wheel the liquid is conducted to the tank 40 from which it passes to the intake ports of the pumps.

My object in using oil instead of water in my pumps is that the oil will keep the parts lubricated and is easier to handle without leakage than water. As it is my intention to use the same oil over and over again, the cost of using oil over that of using water is very slight. Where very high pressures are employed, it may be necessary to employ a flexible diaphragm between the oil and the air in the pressure chamber so as to prevent the air from mixing with the oil or from forming therewith an explosive mixture.

The spherical casing which encloses the pendulum serves to maintain an even depth of water about the same and to protect it from the influence of ocean currents and from becoming entangled with sea weeds. It also permits heavy liquids, such as mercury or oil, to be used.

From the above, it will be seen that I have provided a mechanism that is of simple and substantial construction, which is self-contained and may be towed or otherwise transported to a suitable place where it may be securely anchored. The waves will rock the float while the pendulum, owing to its mounting at or near the center of buoyancy, will remain substantially stationary, whereby relative movement is produced between the float and the pendulum. Means may be provided for transforming this movement into electrical energy which can be transmitted to the land and stored. I have provided the float with compartments that are normally empty and which provide a great amount of buoyancy, but which may readily be flooded in case of storm.

Having now described my invention, what I claim as new is:

1. A wave motor comprising a substantially toroidal shaped float adapted to rest upon the surface of a body of water, said float having a pendulum suspended in the central opening thereof, said pendulum having a float attached to it and adapted to rest upon the surface of a liquid to support the weight of the pendulum.

2. A wave motor comprising a float having a central opening, a spherical casing secured to said float and located in said central opening, a pendulum entirely enclosed within said casing and means comprising a universal joint for securing said pendulum to said casing, said joint being located approximately at the center of said casing.

3. A wave motor comprising a float having a central opening, a spherical casing secured to said float and located in said central opening, a pendulum within said casing, means comprising a universal joint for securing said pendulum to said casing, said joint being located approximately at the center of said casing, said spherical casing including a water-tight compartment surrounding said pendulum near its point of support, and a liquid within said casing, the level of the liquid being above the bottom of the water-tight compartment.

4. A wave motor comprising a float having a central opening, a spherical casing secured to said float and located in said central opening, a pendulum within said casing, means comprising a universal joint for securing said pendulum to said casing, said joint being located approximately at the center of said casing, said spherical casing including a water-tight compartment surrounding said pendulum near its point of support, and a liquid within said casing, the level of the liquid being above the bottom of the water-tight compartment, said pendulum having secured thereto a plurality of conical shaped plates, one within the other, whereby vanes and compartments are formed which cooperate with the liquid within the casing to restrict the movement of the pendulum.

5. A wave motor comprising a float having a central opening, a spherical casing secured to said float and located in said central opening, a pendulum within said casing, means comprising a universal joint for securing said pendulum to said casing, said joint being located approximately at the center of said casing, said spherical casing including a water-tight compartment surrounding said pendulum near its point of support, and a liquid within said casing, the level of the liquid being above the bottom of the water-tight compartment, said pendulum having secured thereto a plurality of vanes and conical shaped plates, one within the other, whereby compartments are formed which cooperate with the liquid within the casing to restrict the movement of the pendulum, and means journaled in the casing and cooperatively connected to the pendulum for converting the relative movement of the pendulum and the casing into an oscillative movement.

6. A wave motor comprising an annular shaped float having an annular water-tight compartment at its top, a plurality of annular spaced decks beneath said compartment, said decks being outwardly and downwardly inclined, the inner and outer edges of said decks being connected so as to form annular compartments, a pendulum pivotally connected to said float at a point substantially at its center of buoyancy, and means for causing the relative movement of the float and the pendulum to be converted into oscillative motion.

7. A wave motor comprising an annular shaped float having an annular water-tight compartment at its top, a plurality of annular spaced decks beneath said compartment, said decks being outwardly and downwardly inclined, the inner and outer edges of said decks being connected so as to form annular compartments, a pendulum pivotally connected to said float at a point substantially at its center of buoyancy, said pendulum having a plurality of annular, downwardly inclined ringlike members secured to the same at their upper ends and spaced to provide annular spaces for the reception of a liquid, and means for causing the relative movement of the pendulum and the float to be converted into oscillative motion.

8. A wave motor comprising a float having a central opening, a spherical casing secured to said float and located in said central opening, a pendulum within said casing, means comprising a universal joint for securing said pendulum to said casing, said joint being located approximately at the center of said casing, said spherical casing including a watertight compartment surrounding said pendulum near its point of support and a liquid within said casing, the level of the liquid being above the bottom of the watertight compartment, said pendulum having secured thereto a plurality of vanes and conical shaped plates, one within the other, whereby compartments are formed which cooperate with the liquid within the casing to restrict the movement of the pendulum, and means journaled in the casing and cooperatively connected to the pendulum for converting the relative movement of the pendulum and the casing into an oscillative movement, said means comprising a shaft whose axis when prolonged passes through the center of said universal joint, a crank arm curved in the arc of a circle whose center is the center of the universal joint, and a crank pin rotatably and slidably connected to said pendulum, said crank pin being so related to the shaft that its axis when prolonged passes through the center of said universal joint.

9. A wave motor comprising a substantially circular float adapted to rest upon the surface of a body of water, a pendulum supported by the float and capable of universal movement with respect thereto, and means secured to the pendulum and operatively connected to the float for transforming the relative movement of the pendulum and the float into an oscillative movement, said means comprising a shaft whose axis projected pass through the center of oscillation of the pendulum, said shaft having one end formed into a crank curved on the arc of a circle whose center is the center of oscillation.

10. A wave motor comprising a substantially toroidal shaped float adapted to rest upon the surface of a body of water, a spherical casing located in the central opening of said float and secured to the latter and a pendulum located within the casing and mounted for oscillation about a point substantially concentric with the casing.

11. A wave motor comprising, in combination, a float adapted to rest upon the surface of a body of water, said float having an opening and a pendulum secured to the float by a universal joint, said pendulum having an air chamber secured thereto which forms a float adapted to support the weight of the pendulum.

12. A wave motor comprising, in combination, a float adapted to rest upon the surface of a body of water, said float having an opening, a casing located within the opening of said float and secured to the latter, said casing being adapted to contain a liquid, a pendulum pivotally attached to said float by means permitting universal movement of the pendulum with respect to the float, the free end of the pendulum extending into the casing and a float secured to the pendulum, said last named float being adapted to support the weight of the pendulum.

13. In a wave motor, in combination, a casing having a concave bottom portion, a pendulum mounted to swing about a pivot substantially concentric with the concave bottom and a liquid in the casing, the pendulum being of such length that it projects into the liquid.

14. In a wave motor, in combination, a casing having a concave bottom portion, a pendulum pivoted to swing about a point located substantially at the center of curvature of the concave portion, a liquid in said casing, said pendulum being of sufficient length to project into the liquid and a float secured to the pendulum, said float being adapted to rest on the surface of the liquid and to support the weight of the pendulum.

In testimony whereof I affix my signature.

DANIEL G. LILLEY.